United States Patent
Chen et al.

(10) Patent No.: US 9,454,661 B2
(45) Date of Patent: Sep. 27, 2016

(54) KEY VERSIONING INCLUDING HASH STICK TECHNOLOGY

(71) Applicant: Microsoft Technology Licensing, LLC, Redmond, WA (US)

(72) Inventors: Ling Tony Chen, Bellevue, WA (US); Felix Stefan Domke, Luebeck (DE); Kenneth D. Ray, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/319,333

(22) Filed: Jun. 30, 2014

(65) Prior Publication Data
US 2015/0379270 A1    Dec. 31, 2015

(51) Int. Cl.
| G06F 21/57 | (2013.01) |
| G06F 21/60 | (2013.01) |
| H04L 9/08 | (2006.01) |
| G06F 21/74 | (2013.01) |

(52) U.S. Cl.
CPC .......... *G06F 21/575* (2013.01); *G06F 21/602* (2013.01); *G06F 21/74* (2013.01); *H04L 9/0861* (2013.01); *H04L 9/0866* (2013.01); *H04L 9/0894* (2013.01); *G06F 2221/034* (2013.01)

(58) Field of Classification Search
CPC .... G06F 21/575; G06F 21/72; G06F 21/602; G06F 2221/034; H04L 9/0861
USPC ..................................................... 713/189, 2
See application file for complete search history.

(56) References Cited

U.S. PATENT DOCUMENTS

| 8,464,011 B2 | 6/2013 | Krig |
| 2002/0152392 A1 | 10/2002 | Hardy et al. |
| 2004/0003235 A1* | 1/2004 | Musa ............... H04L 63/06 713/155 |
| 2005/0005108 A1* | 1/2005 | Harper ............. H04L 9/08 713/165 |
| 2005/0149730 A1* | 7/2005 | Aissi .............. G06F 21/31 713/168 |
| 2010/0042824 A1 | 2/2010 | Lee et al. |
| 2010/0303239 A1 | 12/2010 | James et al. |
| 2013/0129086 A1* | 5/2013 | Tang ............... G06F 21/10 380/44 |

OTHER PUBLICATIONS

"What is a BitLocker Drive Encryption Startup Key or PIN?", Retrieved on: Aug. 12, 2013, 2 pages. Available at: http://windows.microsoft.com/en-IN/windows-vista/What-is-a-BitLocker-Drive-Encryption-startup-key-or-PIN.

(Continued)

*Primary Examiner* — Kambiz Zand
*Assistant Examiner* — Aubrey Wyszynski
(74) *Attorney, Agent, or Firm* — Timothy Churna; Dan Choi; Micky Minhas

(57) ABSTRACT

The subject disclosure is directed towards providing a computing device with access to key that depends on the current software version, e.g., the software version of a security processor. If the software is compromised, another key becomes available with release of each new (non-compromised) software version. Keys for future versions cannot be derived, while keys for earlier versions can be derived from the current key. A secure boot process uses a secret to generate a first key, after which access to the secret is turned off. The first key is used with key blob data to compute a second key used for data decryption (and encryption) as needed. The key blob data may be global for all devices, and/or device specific; a hash stick comprising a set of derivable keys may be used at manufacturing time to generate the device-specific key blob data.

20 Claims, 9 Drawing Sheets

(56) References Cited

OTHER PUBLICATIONS

"Maximize Software Security & Revenue with Hardware Keys", Retrieved on: Aug. 12, 2013, 5 pages. Available at: http://www.keylok.cornklownloads/KEYLOK_Maximizing_Security_and_Revenue_2013.pdf.

"AES Key Wrap Specification", Published on: Nov. 16, 2001, 23 pages. Available at: http://csrc.nist.gov/groups/ST/toolkit/clocuments/kms/key-wrap.pdf.

* cited by examiner

KEY VERSIONING INCLUDING HASH STICK TECHNOLOGY

BACKGROUND

Keeping encryption/decryption keys secret is an important part of any secure computing system. For example, when a computing device or other media is shipped/downloaded to a customer, some or all of the content may be encrypted, and thus need to be decrypted with the appropriate key to be useful. If an attacker is able to exploit a vulnerability and obtain the key, the attacker has access to that content.

Simply fixing the vulnerability in a new software version does not solve the problem. For example, an attacker can take a snapshot of the old version that has the vulnerability, and then reload that version, or the corresponding part thereof to recreate the vulnerability. Any new keys that the old version can access can be revealed even after a device is changed to the new version.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards loading a secret value from a secure storage during a secure boot operation of a computing device. The secret value and version information associated with a software version is used to compute a first key. Access to the secret value is turned off as part of the secure boot operation. The first key and a key blob corresponding to the version information are used to compute a second key, which is used to decrypt data previously encrypted with the second key.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
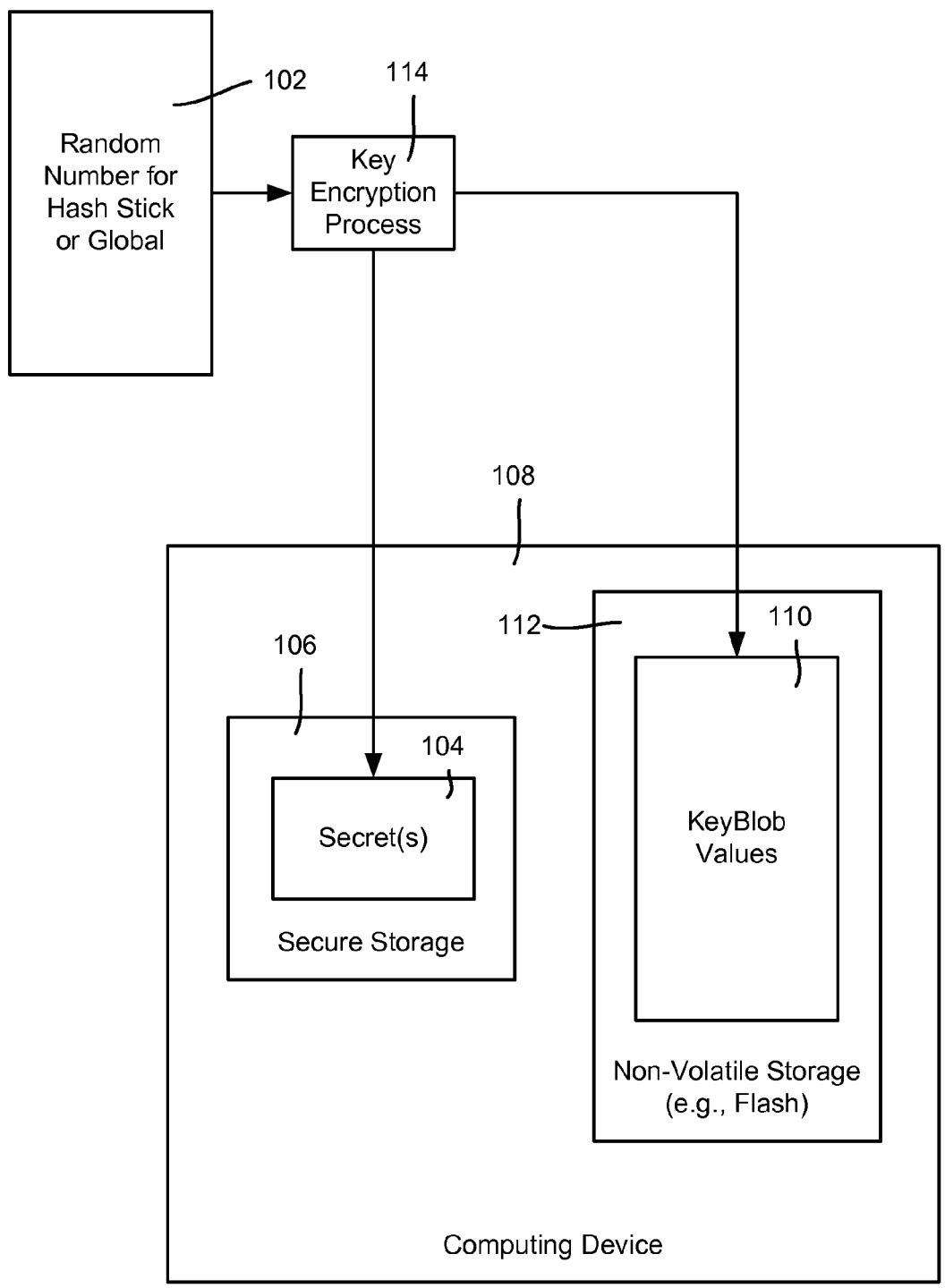
FIG. 1 is a block diagram representing configuring a computing device during manufacturing or the like, including storing one or more secret values on the device along with one or more key blob values, according to one or more example implementations.

Various aspects of the technology described herein are generally directed towards an encryption key technology that allows a computing device system (e.g., hardware and/or software) on a computing device to have access to only certain keys, in which the access is based upon which version of the system is running. As will be understood, certain storage locations (e.g., hardware registers) and particular operations that can be performed on those locations provide a way to keep future keys secret from any previous system version.

In one aspect, each version of the system can use a corresponding key set for its version, as well as keys for earlier versions of the system, but cannot use keys configured for later versions of the system. In other words, older versions of a system are not able to access future keys, but only a current key corresponding to that current, newer system version, as well as to access old keys corresponding to prior versions, providing backwards compatibility with respect to previously encrypted content.

As will be understood, a global key mechanism, in which all similar devices have the same key set for any given software version, may be used with any device/system enabled with the key technology described herein. Further, a hash stick technology may be used as also described herein, in which a per-device key set is used instead of or in addition to a global key set.

It should be understood that any of the examples herein are non-limiting. For instance, some of the example description and drawings primarily show hardware-based protection that is typically far more difficult to attack than software solutions, however the technology also applies to pure software solutions, and/or hybrid hardware and software solutions. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in secure computing in general.

Different sets of keys may be used in one or more implementations, including a global key set and a per-computing device key set (referred to herein as a "hash stick"). By way of example, the global key set may be used for decrypting widely-distributed content that is encrypted (e.g., by a vendor at the vendor's secure location) for all appropriate devices, such as a video game to be played on a gaming console computing device. The per-computing device key set may be used for encrypting and decrypting device-specific content, such as a user's sensitive data. For purposes of explanation, a per-machine hash stick is generally used as an example hereinafter, as the concepts also apply to global keys.

In general, the system version is able to use a corresponding current key set for decryption (and encryption) operations, and any earlier versions, but is not able to use any future versions of the key sets. For example, version three of a system is able to decrypt data encrypted with keys corresponding to versions three, two or one, but not with keys corresponding to versions four or above.

By way of example, assume that an arbitrary code execution bug was exploited in version one of a system whereby hackers had access to the key for decrypting version one encrypted code. When discovered, the vendor upgrades the system to version two to fix the exploit, whereby the upgraded system has access to the version two key. The system then uses the version two key that each computer which has upgraded to version two is able to use (with appropriately version two-encrypted new content), with none of the compromised version one computers being able to derive that version two key. However, if version two of the system needs access to the version one key for any reason, the system may derive this earlier key as described herein.

FIG. 1 is a conceptual diagram showing how such a global key and/or hash stick is used at the time of manufacturing. In general, one or more random numbers 102 may be generated in a secure vendor location, such as a global starting value for all devices, and/or another random number as a starting point for a (per-device) hash stick. The secret or secrets 104 are stored in a secure storage location 106 (e.g., in fuses) of the computing device 108.

As described with reference to FIGS. 1 and 2, the per-device secret may be used at manufacturing time as a basis for a hash stick, from which key blob (KeyBlob) values 110 are derived as described herein. A key encryption process 114 creates the hash stick from which the key blob values are computed, as described below. As can be readily appreciated, the keyblob generation process is similar for global keys or per-device keys, except that for per-device encryption and decryption operations, the KeyBlob values that can be used to re-create the per-device hash stick need to be maintained on the device.

Note that the KeyBlob values do not need to be kept secret, because the secret that (after version-based obfuscation) converts such a value back to the needed decryption key is never revealed. The KeyBlob values for a hash stick need to be maintained on the computing device and thus consume storage, whereby there is a limited number of storage locations and thus versions (e.g., 128 in one implementation) that may be used by a system. Note that in theory the key blob values to recreate the hash stick may be maintained on device-external media, and possibly maintained in device-external media online, but need to be available any time decryption (or encryption) is needed, and thus maintaining the keyblob values on nonvolatile device storage is highly desirable in most scenarios. However, should a computing device fail, a mechanism that allows a user to recover his or her per-device encrypted data may be used provided, e.g., the vendor may maintain the original per-device secret in its vault along with a device identifier.

Thus, the system is able to derive the corresponding keys as needed, with the secret maintained and used to generate a new key for a new version whenever there is a fix to a system execution compromise. As described herein, with a hash stick, a version n will only get access to its version of a key in a register or the like, such that a compromised system cannot deduce the key value for any future version above the current version.

Figure 2:
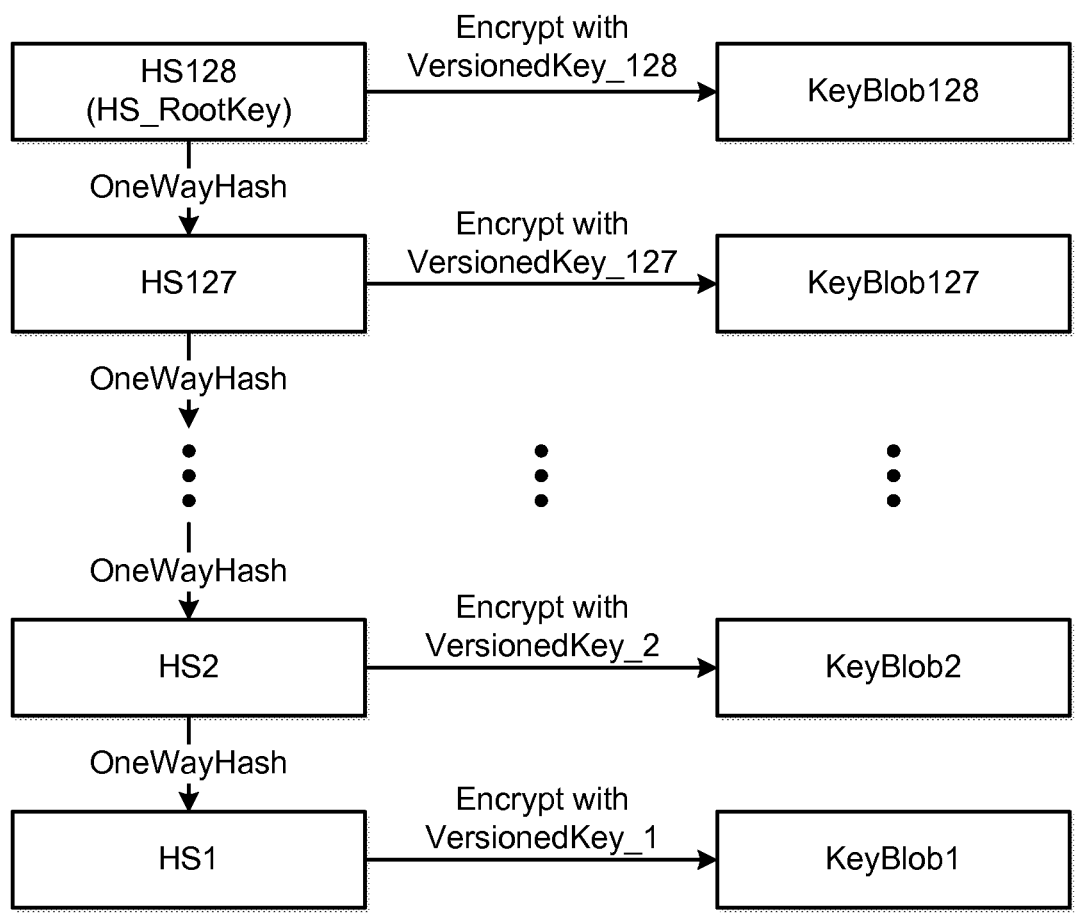
FIG. 2 is a representation of a hash stick, comprising a set of keys corresponding to versions, in which lower version keys are derived from a next-higher version key, with the hash stick used to generate per-version key blobs, according to one or more example implementations.

As shown in FIG. 2, a root key (a random number) may be used to encrypt the hash stick $HS_n$ value to generate Keyblob data that can be recorded, and used in the future to derive $HS_n$ whenever version n of the system is released. The values for the per-computer hash stick as well as the keyblob values are pre-computed at computer provisioning time during manufacturing. The values of the hash stick can then be discarded while the (e.g., 128) KeyBlob values are recorded into nonvolatile storage (110, FIG. 1, e.g., flash memory) on the computing device.

As can be seen in FIG. 2, because some version N of the system will (during user operation) need to be able to deduce the per-computer key for its own version and any earlier version or versions, yet cannot deduce the per-computer key for any future versions, the hash stick starts with a random (e.g., 256 bit) root key for the hash stick (HS_RootKey), with an appropriate one-way hash (e.g., via a one-way hash function) on the value to come up with different, lower-versioned values in the hash stick. Starting with the root key as the highest corresponding version's value, each higher-version hash stick value is used to derive the next lower hash stick value, and so on, until the lowest hash stick value (e.g., for version one) has been computed. For an example in which there are 128 versions, as shown in FIG. 2 (note that subscripts are not used in FIG. 2) the hash stick can then be computed (via an one-way hash function that computes a key, described below) as:

$$HS_n = \text{OneWayHash}^{(128-n)}[HS\_RootKey]. \text{ (Note that } HS\_RootKey = HS_{128}.)$$

Figure 3:
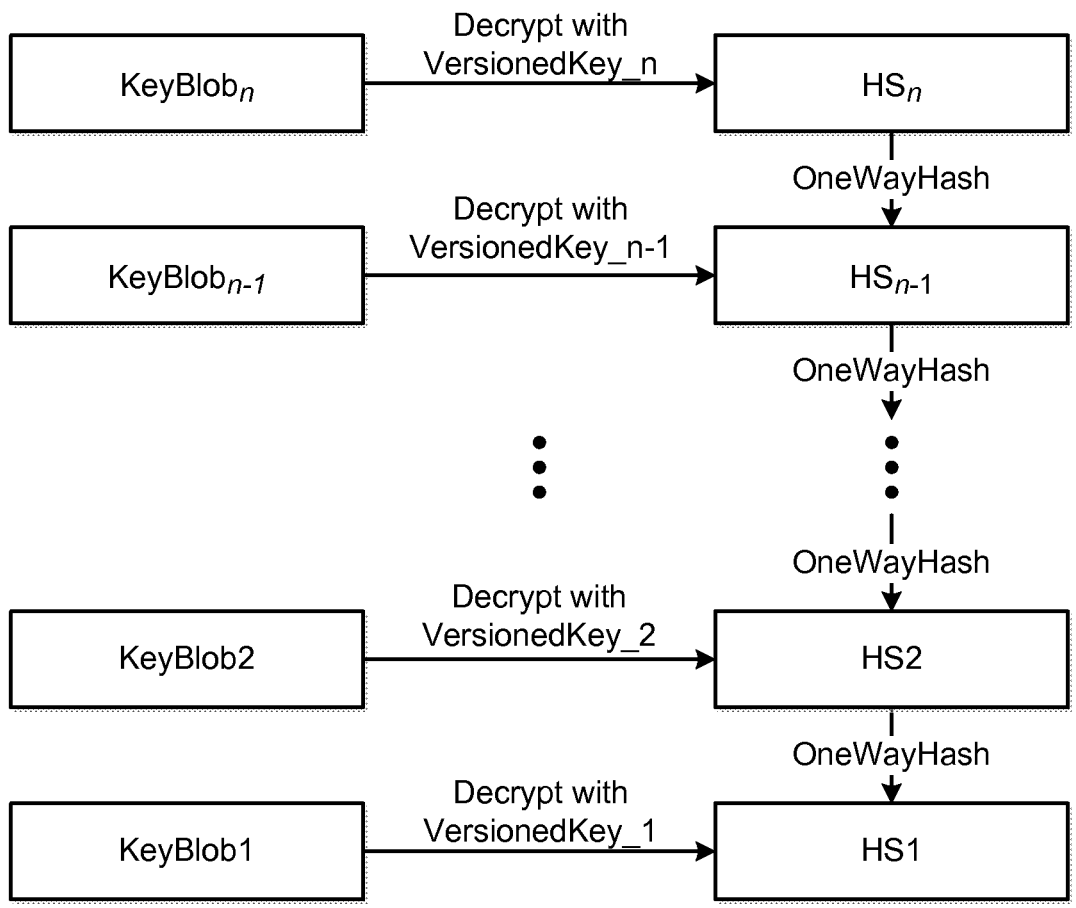
FIG. 3 is a representation of using key blobs to re-compute a hash stick up to and including a per-device key corresponding to a current software version, according to one or more example implementations.

Turning to usage once manufacturing has stored the correct secrets and/or KeyBlob data, FIG. 3 shows this operation in reverse to recreate the relevant part based upon the current version number, from which any lower-versioned hash stick value may be derived. Indeed, as version n of the system is booted, the system is able to decrypt $KeyBlob_n$ to get $HS_n$, as generally exemplified in FIG. 3. With $HS_n$ (with n greater that one) the system is able to derive any of the earlier versions of hash stick, but not any of the newer versions.

Figure 4:
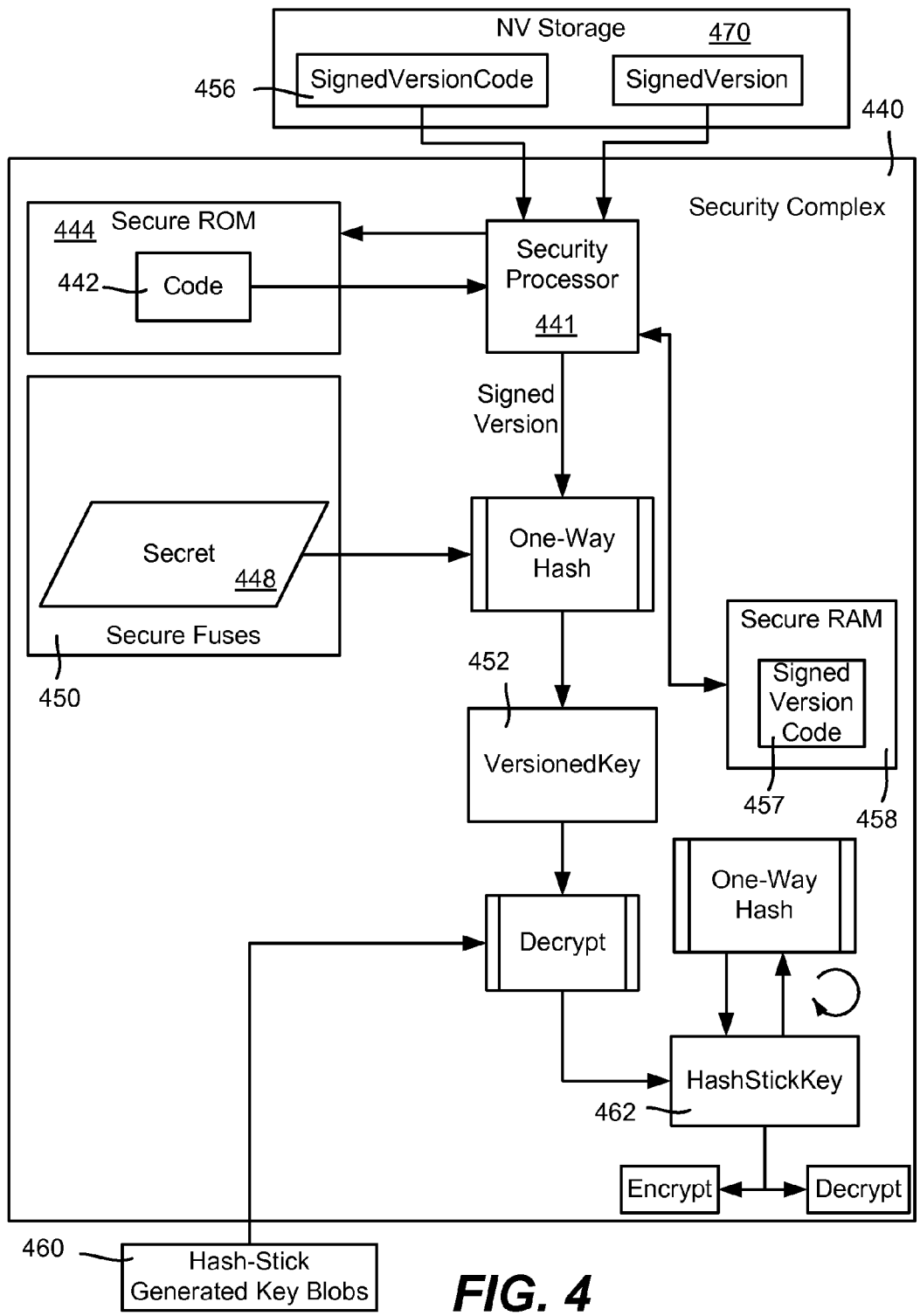
FIG. 4 is a block diagram representation of how a secret, version information and key blob data are used to compute a needed decryption/encryption key up to an including for a current software version, according to one or more example implementations.
Figure 5:
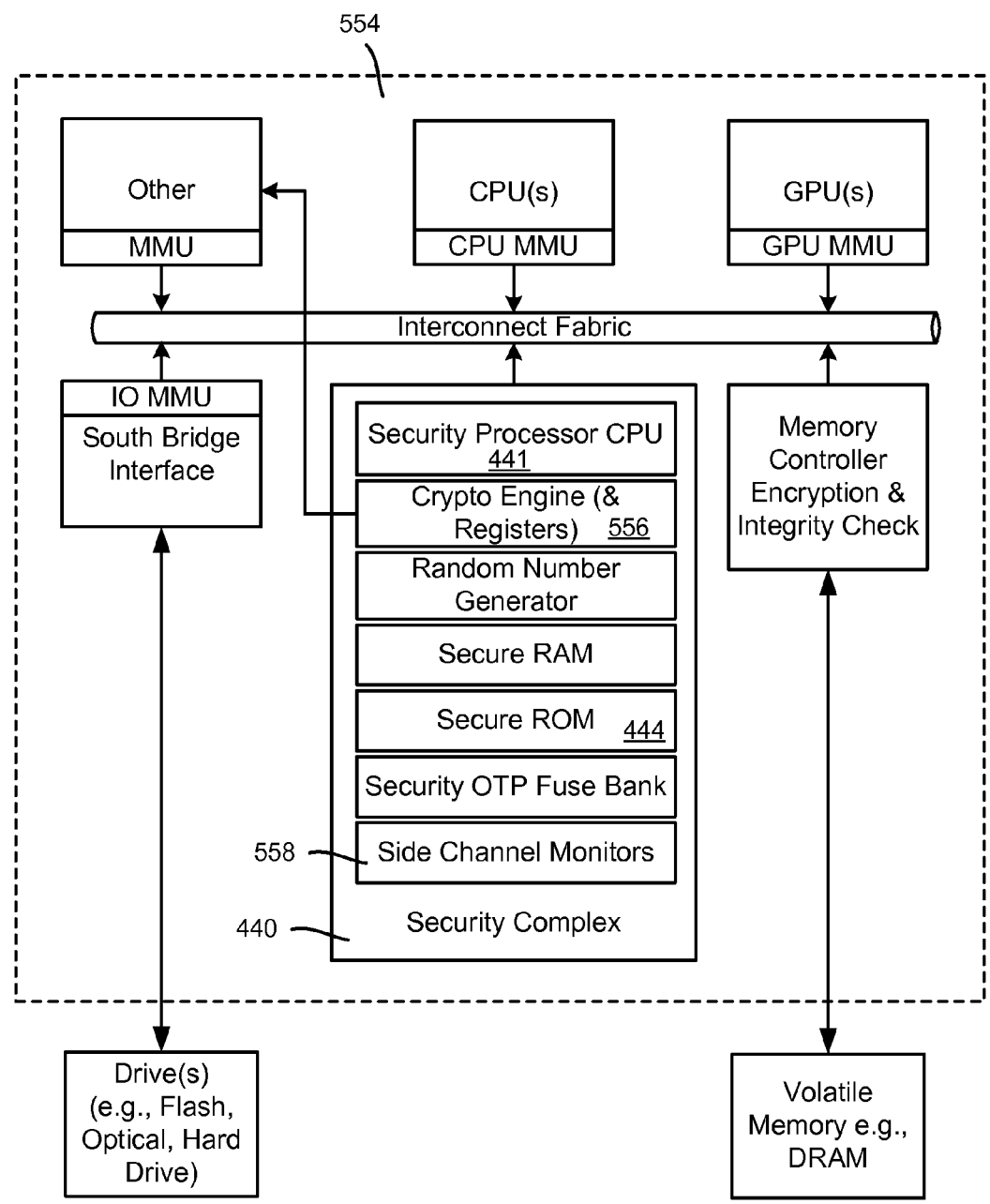
FIG. 5 is a block diagram showing example components of a hardware implementation that may use the technology described herein in a hardware-secured environment, according to one or more example implementations.

Turning to one-hardware based implementation, FIGS. 4 and 5 exemplify a security complex 440 including a security processor 441 that handles computation of a version-specific key or keys. Note that the security complex 440 may be built into hardware or have its functionality performed by software, but in any event, obfuscation operations may take place early in a relatively secure boot process, whereby any compromise of a vulnerability would need to occur before there is any large amount of code such as the kernel loaded (and such larger code is more likely to contain vulnerabilities that may be exploited).

When the security complex 440 (e.g., the security processor 441 of FIG. 5) starts up, the security processor 441 runs instructions from secure boot code 442 in secure ROM 444. The code verifies that the SignedVersion and Signed- VersionCode 456 in nonvolatile storage 470 are correct. Once verified, the security processor 441 jumps into the SignedVersionCode 457 (copied into secure RAM 458) and starts executing the SignedVersionCode 457. With respect to verification, in one example implementation, SignedVersion refers to the version number of the code loaded into the system, e.g., a version from 1 to 128. Note that this version is signed and the secure boot code 442 checks this signature so that an attacker cannot pretend to load software of a future version; only when a new version N of the system code is signed will a machine be able to load version N of the hash stick.

In this example, VersionedKey comprises a hardware key register that holds a key that gets initialized with fuse values at boot time. Software never directly gets access to this key, and can only direct hardware to perform limited (e.g., two) operations on this VersionedKey.

As one operation, during secure boot, once the SignedVersion is known, software provides SignedVersion as input to the hardware to implement the operation:

SignedVersion VersionedKey=OneWayHash(VersionedKey‖SignedVersion)

Once this operation is done, the register VersionedKey has a secret value that is unique to the version of software that is currently loaded. Also, the original VersionedKey value loaded from fuses is lost for the rest of this boot session, and there is no way for software to recover that value.

Another software-initiated operation is to decrypt the KeyBlob that corresponds to the current version into another register, HashStickKey. This operation is as follows:

HashStickKey=Decrypt(VersionedKey,KeyBlob)

where Decrypt may be any decryption operation that uses VersionedKey as the Key, and takes the software-supplied KeyBlob value as input and stores the result into a hardware register, HashStickKey. The decrypt operation in HashStickKey=Decrypt(VersionedKey, KeyBlob) can be of any form including AES block decryption or the NIST standard KeyUnwrap operation. The operation needs to be reversible and the manufacturing process needs to perform the reverse operation in software. In one or more implementations, the key is retrieved from the VersionedKey register and the output is placed in the HashStickKey register via hard coded instructions.

Thus, HashStickKey comprises another hardware key register that holds the values in the hash stick, e.g., a desired value depending on which hash stick value the software needs. In one implementation, the software can never directly access the value in this register, and can only perform the following operations on this register:

1) HashStickKey=OneWayHash(HashStickKey):
This enables software to traverse down the hash stick to get access to earlier versions of HSn. HS(n−1)=OneWayHash(HS(n)):

2) Decrypt/Encrypt with HashStickKey:
This enables the software to use the desired hash stick value as a key to encrypt/decrypt data as needed. The encrypt/decrypt operation can be any form of keyed operation that the system desires (e.g., AES, DES, Keyed HMAC, and so forth).

By way of example, consider that a system booted with version 5 of the code, and software needs access to the version 2 hash stick value to decrypt something, and then later use the version 4 hash stick value to encrypt something. The following are steps that the software performs:

1. At boot time, software finds out that version 5 is booted and does: VersionedKey=OneWayHash(VersionedKey‖"5")
2. Sometime after boot, the software finds out it needs HS2, thus it does:
    a. HashStickKey=Decrypt(VersionedKey, KeyBlob5). This uses the version 5 VersionedKey to decrypt KeyBlob5 to get HS5 and puts that into the HashStickKey hardware register.
    b. Because the software needs HS2, the software does the following three times (since 5−2=3):

HashStickKey=OneWayHash(HashStickKey).

At this point HS2 is in the HashStickKey register.
3. With HS2 in HashStickKey, the software asks the hardware to use HashStickKey to decrypt the data it needs to decrypt.
4. In this example, the software now needs to encrypt something with HS4, and therefore redoes steps 2a and 2b, except that the software only does the HashStickKey=OneWayHash(HashStickKey) operation once (since 5−4=1) this time. This results in HS4 being in the HashStickKey register, and now software can encrypt the desired data using HS4.

Note that step 1 can never be "undone" after the boot, thus preventing KeyBlob6 or any higher version from being correctly decrypted. As such HS6 or higher cannot be deduced either. An assumption is that an attacker can only take over the software on the security processor after the VersionedKey=OneWayHash(VersionedKey‖Signed Version); whereby in general, the sooner this operation happens in the boot process the better. If the attacker can take over before this operation, then he or she can fake the signed version and get access to any HSn value and break the system.

The secure ROM code 442 uses the secret 448 in the secure fuses 450, which may or may not be in the security complex) as the basis for a first set of keys. For example, the secret 448 is obfuscated into the VersionedKey register 452 based upon the current version number. Note that obfuscation of the secrets 448 via a one-way hash takes place almost immediately so that the secret 448 exists outside of the fuses 450 for only a very brief moment. In one implementation, the one-way hash function encrypts the secret in the same VersionedKey register, which obfuscates the secret so that even if the register is later compromised, the secret is not. As one alternative, the secret may be put in one register, encrypted into another register, and erased thereafter; other techniques may be used. As will be understood, regardless of which technique is used, in general each secret is only used once at the very start of the boot operation, with no access to that secret thereafter.

After obfuscation of the secret, the security processor may run the SignedVersionCode. Thus, as can be readily appreciated, only a very limited amount of code needs to be securely executed for verification and until the VersionedKey register contains the appropriate value. As is understood, a security complex is only one way to protect the secret; indeed, any way to use the secret(s) to generate the global and/or per-computer value(s) and then turn off access to the secrets (including by obfuscation as exemplified herein or any other mechanism), before the rest of the boot code begins, provides more defense against system vulnerabilities than operating without such a mechanism.

Once computed, the value in the VersionedKey register 452 may be used with a current key blob 460 to decrypt into the hash stick value in the HashStickKey register 462. This value may then be used as is, or one-way hashed as many times as needed to get to a lower-versioned hash stick value, for use in decryption/encryption operations.

FIG. 5 shows a generalized block diagram of one implementation in hardware, including example components in which aspects of the technology described herein may be implemented in a way that facilitates keeping secrets and keys secure. Note that in FIG. 5, the dashed block labeled 554 may represent a system on chip (SoC) for example, however this is only one alternative. Indeed, the components shown and/or arranged in FIG. 5 are only one non-limiting example of a way in which such components may be present and/or arranged.

In one or more implementations, the security complex 440 is in charge of stopping, starting and configuring other components. As will be understood, to be effective against attacks, even when an attacker manages to execute code on the security processor 441 of the security complex 440, certain secrets are not extractable by means of such compromised code in the exemplified implementation of FIG. 5.

To this end, the security complex 440 contains sensitive keys to which only one or more specific components therein have access, and is responsible for controlling access and usage of these keys. For example, in the example of FIG. 5, the security processor 441 cannot access (or have the ability to generate) future keys for later versions. Instead, in one or more implementations, a set of cryptographic registers and related operations (via an engine), represented as block 556, are implemented in hardware to ensure that the system can generate new key material after a security flaw has been resolved in a later version.

In the example of FIG. 5, the security processor 441 is the first component to come out of reset and boot up the rest of the system. The security processor 441 starts executing code from secure ROM 444 inside the security complex 440, and gradually pulls in more boot code from external sources only after such code has been carefully verified to be signed correctly. As can be readily appreciated, securely bootstrapping the system provides a way to override (e.g., morph) secret key material before any later loaded/executed software that is more vulnerable to compromise has an opportunity to access that secret key material.

The cryptographic engine (crypto engine) including registers (block 556) in the security complex 440 has anti-side channel attack measures (monitors 558) in place to prevent the disclosure of key values when these crypto operations are being performed. As another benefit, in one or more implementations the crypto engine (which may be considered one or more engines) is also capable of performing accelerated AES, SHA, RSA, and ECC operations, which allows performing crypto operations faster than traditional software.

Note that traditionally, crypto engines are controlled by the CPU/processor controlling them, which traditionally is the security processor. This means that the keys being used inside the crypto engines are also available to the security processor, whereby if any takeover class software fault is found in the security processor software, then secrets on the system are discoverable.

In contrast, in one or more implementations of the technology described herein, the crypto engine in block 556 is associated with extra (e.g., fixed-function) crypto registers and related crypto commands, which are added to the security complex 440 to enable sensitive keys to never be disclosed to the security processor 441 itself. As a result, keys are not able to be disclosed through a software attack, (forcing any attacker to perform a hardware attack on individual pieces of hardware in order to extract sensitive keys, which is far more difficult).

As described above with reference to FIG. 4, during the very start of the boot-up process, (and only then, which is whenever the security processor 441 resets and before executing the SignedVersionCode 457), the VersionedKey register 452 is initialized by reading the secret 448 from fuses 450, respectively. These secrets are modified by an obfuscation function that also uses the current version.

Per computer secrets are used to generate keys for encrypting and decrypting local content. However, when upgrading the system (e.g., the security processor code) from version N to version N+1, after rebooting the system, there may be a need to access and use the old version N per computer key, otherwise the system would be unable to decrypt any of the content that was encrypted when the system was running in version N.

$HS_n$ represents the per-version per-computer symmetric key for version n, where n is the version number of the system. A hash stick property is that $HS_n$ can be used to derive all $HS_i$ for i<n (back to the lowest version, $HS_1$ in one implementation). Thus, by using $HS_n$ as the version N per-computer symmetric key, the system is able to derive the per-computer symmetric key for any previous releases, but it cannot be used to predict the keys for future releases.

Thus, in the above example in which an arbitrary code execution bug was exploited in version one of the security processor, assume that the hackers had access to $HS_1$. When discovered, the vendor upgrades the security processor to version 2 to fix the exploit and the new security processor version 2 code decrypts the value of $KeyBlob_2$ and stores that value in the HashStickKey register using the decrypt and store operation. At this point there is a new per-computer secret that each computer that has upgraded to version 2 is able to use, with none of the compromised version 1 computers able to derive. If version 2 of the security processor needs access to the version 1 per-computer secret for any reason, the security processor simply performs the one-way hash operation in order to derive $HS_1$. Afterwards, if $HS_2$ is needed again, the security processor may use the VersionedKey register and the key blob for version to reload $HS_2$. Alternatively, there may be multiple registers for various needed versions, with a map between version and which register has the correct value for the version.

Figure 6:
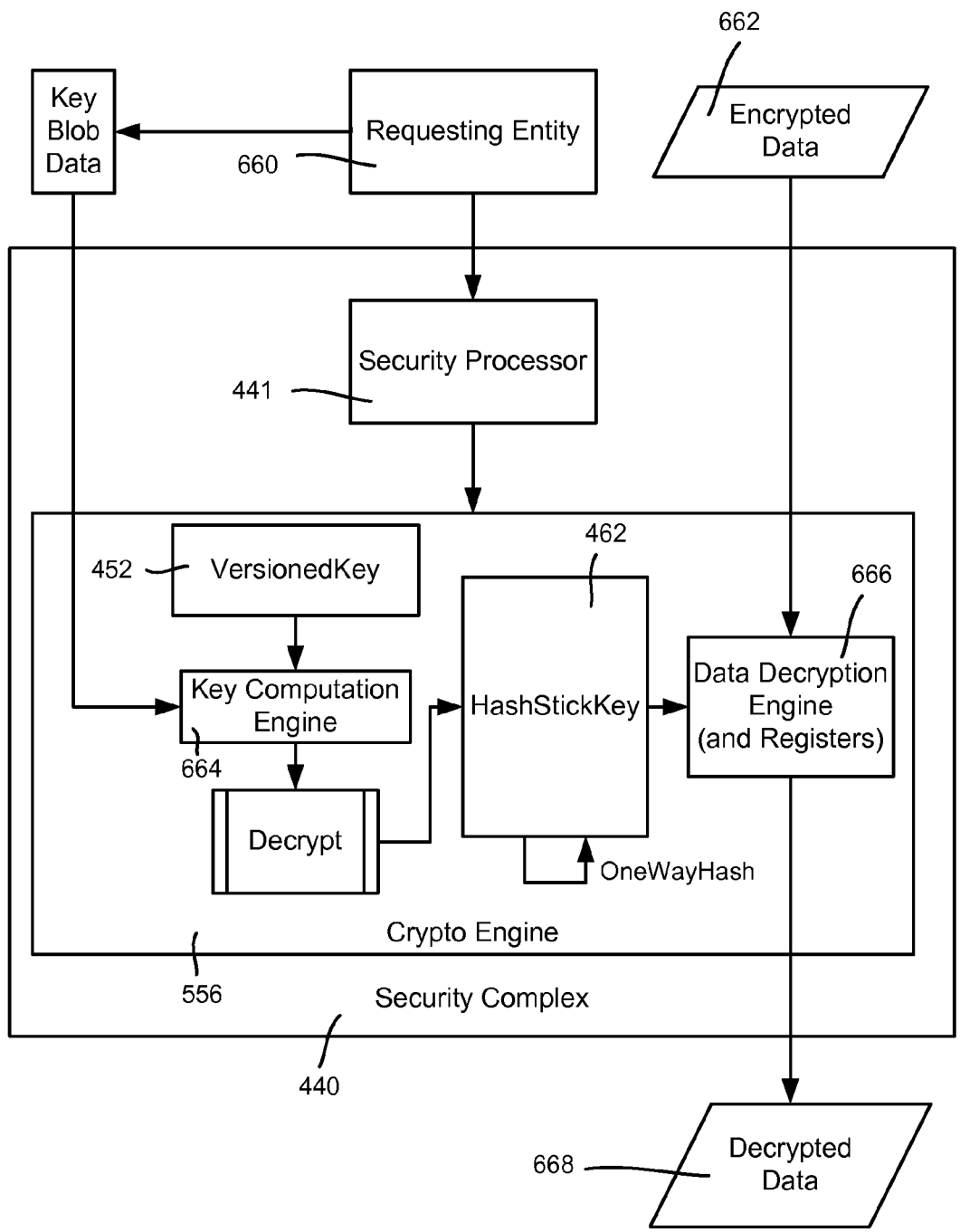
FIG. 6 is a block diagram representation of how a version-dependent key may be computed for use in decryption operations, according to one or more example implementations.

FIG. 6 shows decryption operations for a requesting entity 660 and a source of encrypted data 662. In general, the requesting entity makes the request, which is received by the security complex 440/security processor 441. As described above, the security processor 441 in one implementation does not have access to the crypto engine code (or registers), block 556 and thus uses one or more primitives or the like to coordinate the decryption operation. For example, the software in the security processor 441 can request VersionedKey=OneWayHash(VersionedKey∥SignedVersion) by supplying the SignedVersion to the operation. Further, the software in the security processor 441 can request HashStickKey=Decrypt(VersionedKey, KeyBlob) by supplying the KeyBlob to the operation.

A key computation engine 664 is shown as performing the decrypt operation, and zero or more one-way hash operations as needed to get to the desired (lower) version hash stick value, as requested by the security processor 441. The value may be maintained in a suitable register incorporated into or coupled to a decryption engine 666 in hardware to expedite decryption of decrypted data 668 to the target location.

Figure 7:
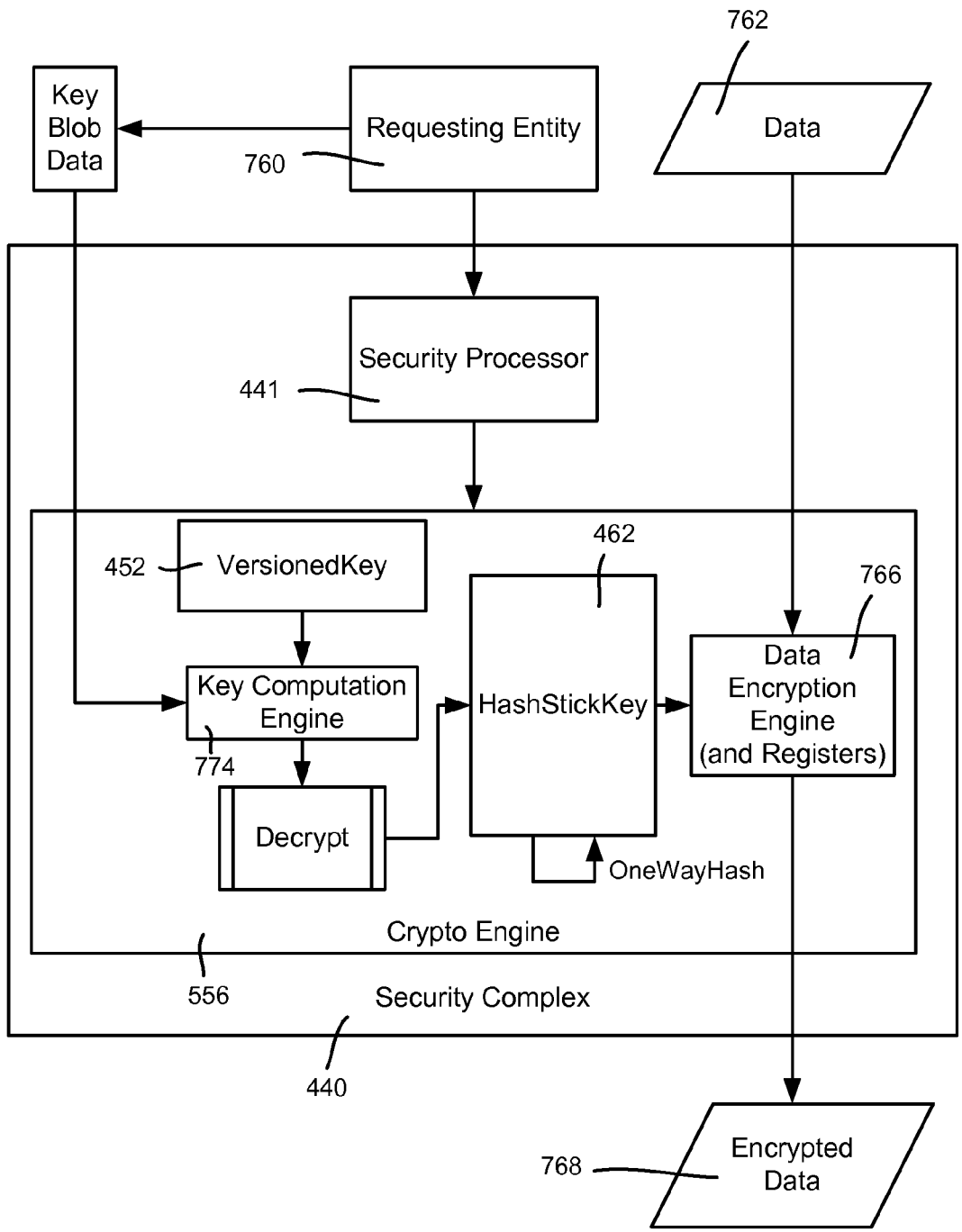
FIG. 7 is a block diagram representation of how a version-dependent key may be computed for use in encryption operations, according to one or more example implementations.

FIG. 7 shows encryption operations for a requesting entity 770 and a source of encrypted data 772. In general, the requesting entity makes the request, which is received by the security complex 440/security processor 441. As described above, the security processor 441 in one implementation does not have access to the crypto engine code (or registers), block 556 and thus uses one or more primitives or the like to coordinate the decryption operation. A key computation engine 774 is shown as performing the decrypt operation with the key blob data and VersionedKey register 452 to get the current hash stick value, and zero or more one-way hash operations as needed to get to the desired (lower) version hash stick value, as requested by the security processor. The decrypted or derived value may be maintained in a suitable AES register incorporated into or coupled to an encryption engine 776 in hardware to expedite encryption of the data 778 to the target location.

Note that data encrypted under a previous version remains vulnerable to being revealed. Thus, an application or the like may be used to decrypt data from an earlier version and automatically re-encrypt it to the later version.

Figure 8:
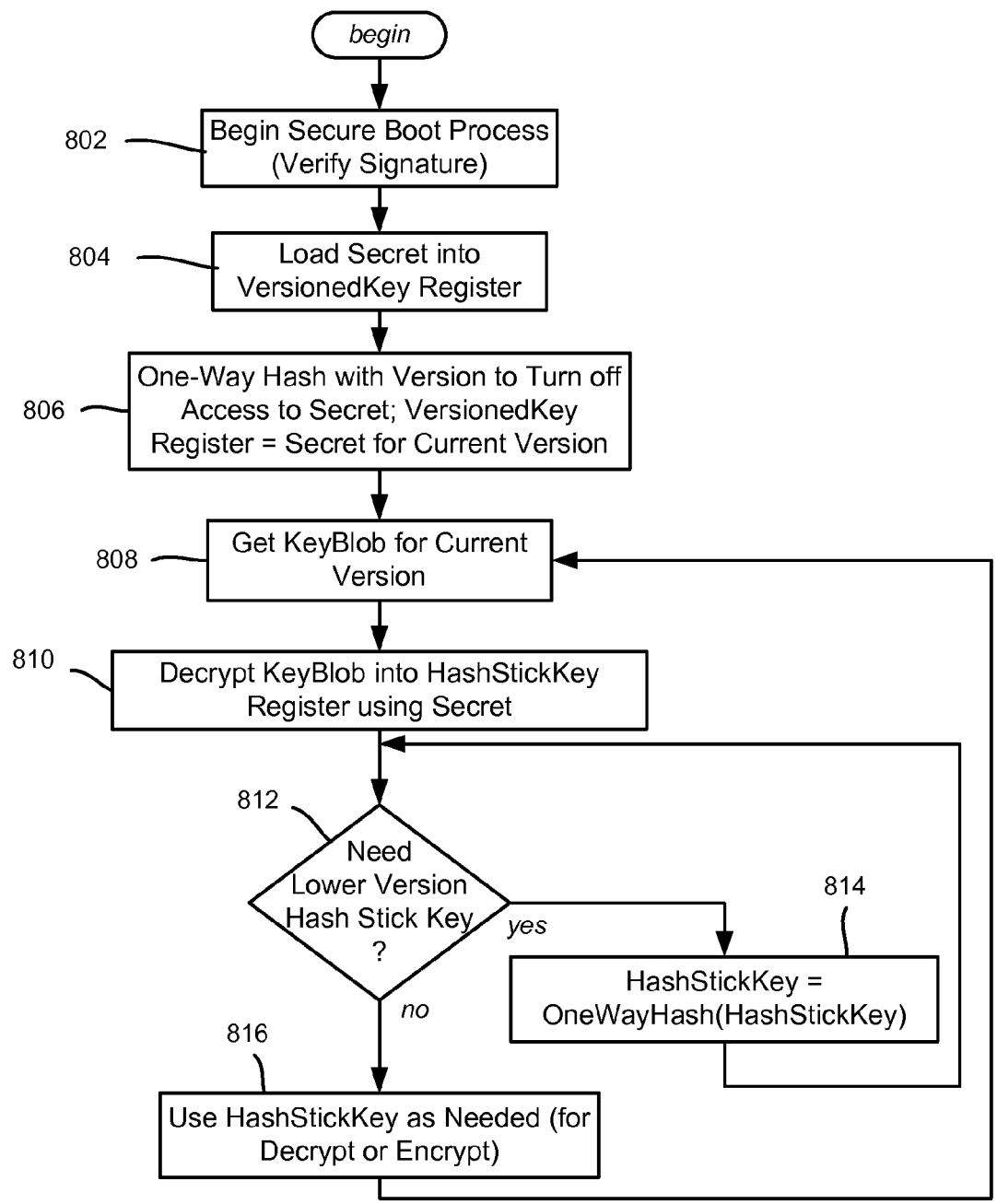
FIG. 8 is a flow diagram showing example steps that may be taken in computing version-dependent keys based upon a secret in a secure boot operation, and the use of a version-dependent key thereafter, according to one or more example implementations.

FIG. 8 is a simplified flow diagram summarizing some example steps related to securely preparing a system with a key that is used as a basis for version-based encryption or decryption, and the use of that key. Step 802 represents starting the secure boot process, including verifying the signed version; the SignedVersion of the loaded code is verified to be signed correctly, otherwise an attacker can load a fake future version and get access to future keys.

Step 804 loads a secret into a secure memory location, such as a secure hardware register. Step 806 represents computing a first key value based upon the secret and the current version, and also turns off access to the secret. In one or more implementations described above, this may be accomplished by loading the secret into the VersionedKey register and performing the one-way hash thereon based upon the current version number. Note that in one or more implementations the one-way hash operation accomplishes both getting the needed value into the register and turning off access to the secret since VersionedKey register is basically overwritten with the hashed value thereof, however it is feasible to do this in separate steps. Note further that if there are two or more secrets, e.g., a global secret and a per-computing device secret), steps 804 and 806 can be repeated for each secret, e.g., in a separate VersionedKey register for each.

Step 808 represents getting the keyblob for the current version, which step 810 decrypts into the hash stick key value. If this is not the desired hash stick key, steps 812 and 814 perform (and repeat as needed) the one-way hashing to derive the lower hash stick value.

When the desired version is in the appropriate register, step 816 represents using the decrypted or derived key as needed to perform encryption or decryption operations.

At some point, a different hash stick key may be needed. If so, the process may be repeated from step 808. Note however that if the hash stick key version is tracked, and a lower version is needed, the process may repeat from step 812.

Note that for acceleration, the decrypted key and any derived key may be placed into its own register, e.g., for use by the crypto engine. For example, the key for version three may be written to one decryption register, the key for version two to another decryption register, and the key for version one written to yet another decryption register, e.g., with a map maintained for which register has which version's key. In this way, the system may rapidly switch to decrypt any version of data, for example, without having to re-derive earlier versions from the current version key each time.

As can be seen, there is provided a way to keep future keys secret, while providing access to keys up to a corresponding current version. Note that in general it is more secure to keep secrets within hardware than to let software control the keys, as software flaws will result in the disclosure of the keys. At the same time, however, software versioning is problematic; for example, if only one fixed key is kept in hardware, then when any version of the software is compromised, the compromised software will have oracle access to that one key forever. In contrast, the technology described herein allows upgrading of software to a version that no longer has a compromise, with a new key securely becoming available for the new software. Further, the technology supports backwards compatibility with data encrypted with an earlier key, yet without providing any access to future keys that may need to be used.

Example Operating Environment

It can be readily appreciated that the above-described implementation and its alternatives may be implemented on any suitable computing device/machine or similar machine logic, including a gaming and/or entertainment system/console, personal (e.g., laptop or desktop) computer, tablet, wearable computing device, appliance (e.g., television, DVR, set-top box), smartphone, standalone device and/or the like. Combinations of such devices are also feasible when multiple such devices are linked together. For purposes of description, a gaming (including media) system is described as one example operating environment hereinafter. However, it is understood that any or all of the components or the like described herein may be implemented in storage devices as executable code, and/or in hardware/hardware logic, whether local in one or more closely coupled devices or remote (e.g., in the cloud), or a combination of local and remote components, and so on.

Figure 9:
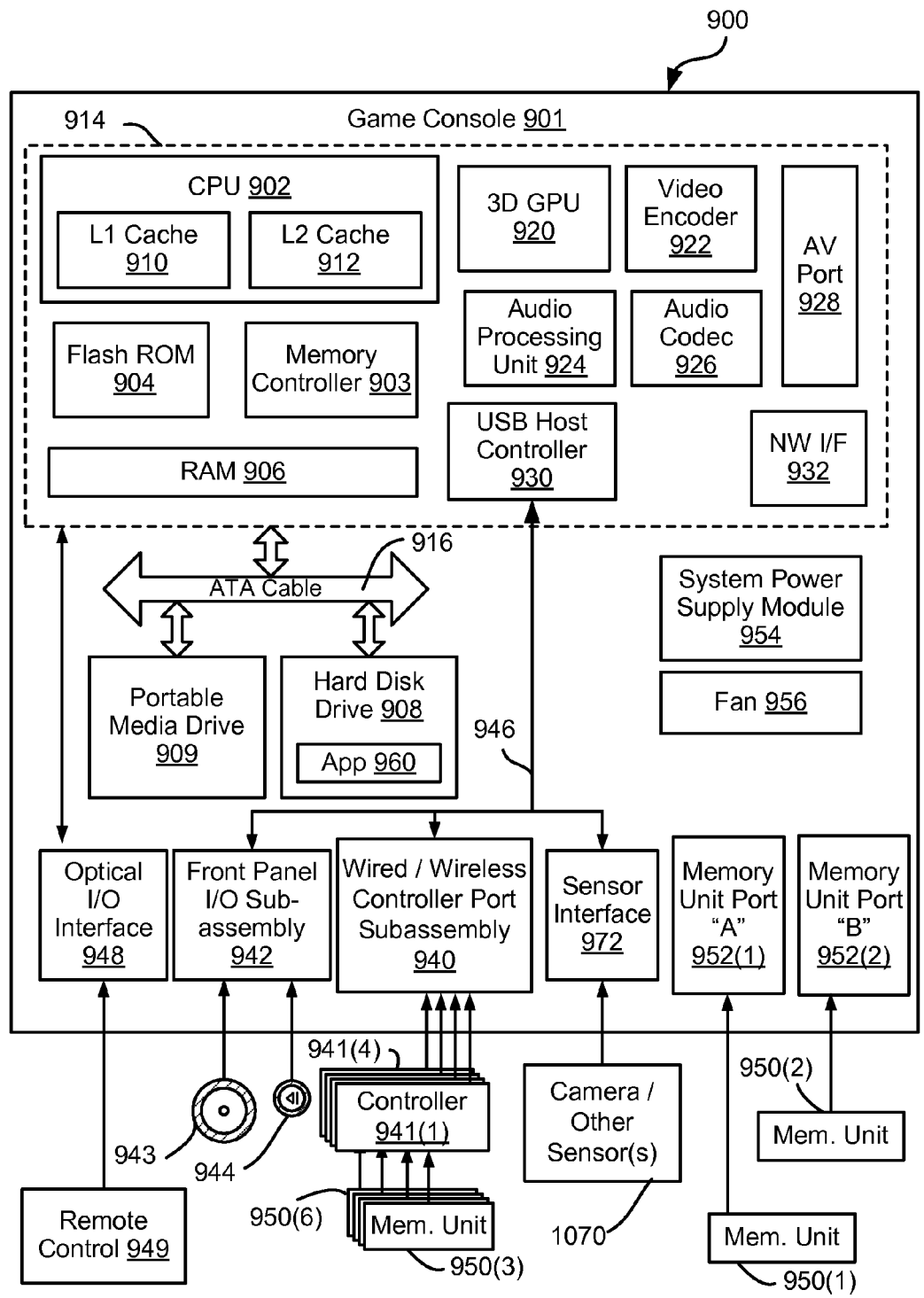
FIG. 9 is a block diagram representing an example non-limiting computing system and/or operating environment, exemplified as a gaming console, in which one or more aspects of various embodiments described herein can be implemented.

FIG. 9 is a functional block diagram of an example gaming and media system 900 and shows functional components in more detail. Console 901 has a central processing unit (CPU) 902, and a memory controller 903 that facilitates processor access to various types of memory, including a flash Read Only Memory (ROM) 904, a Random Access Memory (RAM) 906, a hard disk drive 908, and portable media drive 909. In one implementation, the CPU 902 includes a level 1 cache 910, and a level 2 cache 912 to temporarily store data and hence reduce the number of memory access cycles made to the hard drive, thereby improving processing speed and throughput.

The CPU 902, the memory controller 903, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 902, the memory controller 903, the ROM 904, and the RAM 906 are integrated onto a common module 914. In this implementation, the ROM 904 is configured as a flash ROM that is connected to the memory controller 903 via a Peripheral Component Interconnect (PCI) bus or the like and a ROM bus or the like (neither of which are shown). The RAM 906 may be configured as multiple Double Data Rate Synchronous Dynamic RAM (DDR SDRAM) modules that are independently controlled by the memory controller 903 via separate buses (not shown). The hard disk drive 908 and the portable media drive 909 are shown connected to the memory controller 903 via the PCI bus and an AT Attachment (ATA) bus 916. However, in other implementations, dedicated data bus structures of different types can also be applied in the alternative.

A three-dimensional graphics processing unit 920 and a video encoder 922 form a video processing pipeline for high speed and high resolution (e.g., High Definition) graphics processing. Data are carried from the graphics processing unit 920 to the video encoder 922 via a digital video bus (not shown). An audio processing unit 924 and an audio codec (coder/decoder) 926 form a corresponding audio processing pipeline for multi-channel audio processing of various digital audio formats. Audio data are carried between the audio processing unit 924 and the audio codec 926 via a communication link (not shown). The video and audio processing pipelines output data to an A/V (audio/video) port 928 for transmission to a television or other display/speakers. In the illustrated implementation, the video and audio processing components 920, 922, 924, 926 and 928 are mounted on the module 914.

FIG. 9 shows the module 914 including a USB host controller 930 and a network interface (NW I/F) 932, which may include wired and/or wireless components. The USB host controller 930 is shown in communication with the CPU 902 and the memory controller 903 via a bus (e.g., PCI bus) and serves as host for peripheral controllers 934. The network interface 932 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 9, the console 901 includes a controller support subassembly 940, for supporting at least four game controllers 941(1)-941(4). The controller support subassembly 940 includes any hardware and software components needed to support wired and/or wireless operation with an external control device, such as for example, a media and game controller. A front panel I/O subassembly 942 supports the multiple functionalities of a power button 943, an eject button 944, as well as any other buttons and any LEDs (light emitting diodes) or other indicators exposed on the outer surface of the console 901. The subassemblies 940 and 942 are in communication with the module 914 via one or more cable assemblies 946 or the like. In other implementations, the console 901 can include additional controller subassemblies. The illustrated implementation also shows an optical I/O interface 948 that is configured to send and receive signals (e.g., from a remote control 949) that can be communicated to the module 914.

Memory units (MUs) 950(1) and 950(2) are illustrated as being connectable to MU ports "A" 952(1) and "B" 952(2), respectively. Each MU 950 offers additional storage on which games, game parameters, and other data may be stored. In some implementations, the other data can include one or more of a digital game component, an executable gaming application, an instruction set for expanding a gaming application, and a media file. When inserted into the console 901, each MU 950 can be accessed by the memory controller 903. The gaming system 900 also includes one or more machine-readable storage devices or machine logic having executable instructions.

A system power supply module 954 provides power to the components of the gaming system 900. A fan 956 cools the circuitry within the console 901.

An application 960 comprising machine instructions is typically stored on the hard disk drive 908. When the console 901 is powered on, various portions of the application 960 are loaded into the RAM 906, and/or the caches 910 and 912, for execution on the CPU 902. In general, the application 960 can include one or more program modules for performing various display functions, such as controlling dialog screens for presentation on a display (e.g., high definition monitor), controlling transactions based on user inputs and controlling data transmission and reception between the console 901 and externally connected devices.

As represented via block 970, a camera (including visible, IR and/or depth cameras) and/or other sensors, such as a microphone, external motion sensor and so forth may be coupled to the system 900 via a suitable interface 972. As shown in FIG. 9, this may be via a USB connection or the like, however it is understood that at least some of these kinds of sensors may be built into the system 900.

The gaming system 900 may be operated as a standalone system by connecting the system to high definition monitor, a television, a video projector, or other display device. In this standalone mode, the gaming system 900 enables one or more players to play games, or enjoy digital media, e.g., by watching movies, or listening to music. However, with the integration of broadband connectivity made available through the network interface 932, gaming system 900 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising a computing device including a processor and memory coupled to the processor, the computing device including a secure memory that includes a secure boot process, the secure boot process configured to generate a first key value based upon a secret value and current software version information, and to turn off further access to the secret value, a key computation engine configured to compute a second key based upon the first key and key blob data, in which the key blob data used by the key computation engine corresponds to the current software version information, a decryption mechanism configured to use the second key to decrypt data, a security processor, a first hardware register that contains the first key and a second hardware register that contains the second key, in which the security processor has no direct access to the first hardware register or second register and communicates requests to other hardware to perform operations related to the register.

2. The system of claim 1 wherein the secret value is loaded into a hardware register and one-way obfuscated in the hardware register based upon the current software version information, in which the one-way obfuscation turns off further access to the secret value.

3. The system of claim 1 wherein the key blob data comprises global key blob data corresponding to the current software version information, or per-computer key blob data corresponding to the current software version information.

4. The system of claim 3 wherein the second key is used to derive another key corresponding to an earlier software version.

5. The system of claim 4 wherein the another key is utilized to derive a different key corresponding to a software version that is prior to the earlier software version.

6. The system of claim 1 wherein the second key comprises a hash-stick key value decrypted based upon the first key and a per-computer hash stick key blob corresponding to the current software version.

7. The system of claim 6 wherein the hash stick key value is one-way hashed into a lower version hash stick key value.

8. The system of claim 6 wherein the per-computer hash stick key blob data is maintained in non-volatile storage on the computing device.

9. The system of claim 1 further comprising an encryption mechanism configured to use the second key to encrypt data.

10. The system of claim 1 wherein the secure boot process is maintained in secure ROM in a hardware-based security complex.

11. The system of claim 1 wherein the computing device comprises a gaming console, a personal computer, a tablet computer, a hand-held computer, a smartphone or an appliance.

12. A method comprising: loading a secret value from a secure storage during a secure boot operation of a computing device;
using the secret value and version information associated with current software version information to compute a first key, in which the current software version information is verified to prevent a higher versioned key from being computed;
turning off access to the secret value as part of the secure boot operation;
using the first key and a key blob corresponding to the version information to compute a second key; and
using the second key to derive another key associated with an earlier software version.

13. The method of claim 12 wherein the key blob corresponds to a global key blob, and wherein loading the secret value comprises loading a global secret value.

14. The method of claim 12 wherein the key blob corresponds to a per-device key blob, and wherein loading the secret value comprises loading a per-device secret value.

15. The method of claim 14 further comprising, configuring the computing device with a plurality of per-device key blob values, in which each key blob value is derived from a counterpart value in a hash stick, the hash stick comprising a highest version key and lower version keys, each lower version key derived from a next higher version key.

16. The method of claim 12 further comprising, using the second key to encrypt data or to decrypt data.

17. The method of claim 12 wherein the another key is utilized to derive a different key corresponding to a software version that is prior to the earlier software version.

18. One or more machine-readable storage devices having executable instructions, which upon execution perform operations, comprising:
performing a secure boot process, including using a secure secret value and verified software version information to compute a first key and thereafter turning off access to the secret value;
computing a second key based upon the first key and key blob data that corresponds to the version information;
using the second key to decrypt data; and
computing another key associated with an earlier software version, in which the second key is used to derive the other key, and using the other key to decrypt other data.

19. The one or more machine-readable storage devices of claim 18 having further machine-readable instructions comprising using the second key to encrypt data.

20. The one or more machine-readable storage devices of claim 18 having further machine-readable instructions wherein the another key is utilized to derive a different key corresponding to a software version that is prior to the earlier software version.

* * * * *